United States Patent [19]

Kanno

[11] Patent Number: 4,947,158
[45] Date of Patent: Aug. 7, 1990

[54] METHOD AND APPARATUS FOR FILLING IN AN INNER REGION OF A PATTERN

[75] Inventor: Hiroshi Kanno, Shiroishi, Japan

[73] Assignee: Ricoh Company, Ltd., Tokyo, Japan

[21] Appl. No.: 164,901

[22] Filed: Mar. 7, 1988

[30] Foreign Application Priority Data

Mar. 13, 1987 [JP] Japan .................................. 62-58508

[51] Int. Cl.$^5$ .............................................. G09G 1/00
[52] U.S. Cl. .................................. 340/747; 340/803
[58] Field of Search ............... 340/747, 703, 728, 803; 382/27

[56] References Cited

U.S. PATENT DOCUMENTS 4,646,076  2/1987  Wiedevmav et al. ................ 340/728

FOREIGN PATENT DOCUMENTS 163164   8/1985  Japan .
212796  10/1985  Japan .
175877   8/1986  Japan .

OTHER PUBLICATIONS

"Polygon Painting Method", IBM Technical Disclosure Bulletin, vol. 28, No. 7, Dec. 1985, pp. 3080-3081.

Primary Examiner—Alvin Oberley
Attorney, Agent, or Firm—Oblon, Spivak, McClelland, Maier & Neustadt

[57] ABSTRACT

A method for filling a region inside a closed loop line of a pattern with pixel data having values identical to those of pixel data forming the loop line. One pixel datum of a pixel to be processed is extracted from the image memory, together with pixel data of its neighboring pixels by scanning the image memory at least one time. A logical operation is performed to decide whether or not a value of said one pixel datum should be changed to a value of the pixel datum identical to those of the pixel data forming the loop line. In the logical operation, values of the pixel data of the neighboring pixels are used in addition to the value of said one pixel datum. A result of the logical operation is stored in a related storage region of the image memory in place of said one pixel datum.

9 Claims, 8 Drawing Sheets

FIG.1A PRIOR ART    FIG.1B PRIOR ART
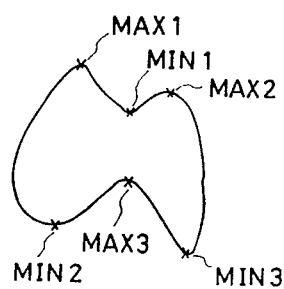
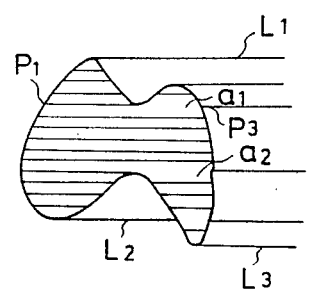
FIG. 3
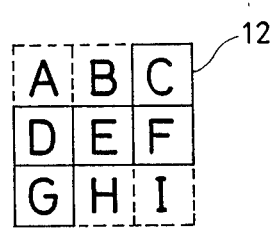
FIG.12A
| A | B | C | D |
|---|---|---|---|
| E | F | G | H |
| I | J | K | L |
| M | N | O | P |
FIG.12B
| C | B | A |
|---|---|---|
| F | E | D |
| I | H | G |
13

METHOD AND APPARATUS FOR FILLING IN AN INNER REGION OF A PATTERN

BACKGROUND OF THE INVENTION

The present invention generally relates to a method and apparatus for filling in an inner region of a pattern, and in particular to a method and apparatus for filling a region inside a closed loop line of a pattern with pixel data having values identical to those of pixel data forming the closed loop line. The present invention can be suitably applied to a picture image processing apparatus in which a picture image optically read by an image scanner is stored in an image memory, and is printed out by an image printer, for example.

At present, various picture image processing apparatuses have been utilized. For example, an optical reader has an image scanner which optically scans a sheet of paper and produces electric picture image data. The image data from the scanner are successively transferred to an image memory and are stored therein. The image data stored in the image memory are binary data (pixel data). For example, a picture pattern portion on the sheet is represented by a binary number one, and a background portion of the sheet is represented by a binary number zero. In the case where the image memory forms a bit map memory consisting of M rows and N columns, a pattern consisting of data of binary ones is formed on the map, so that it has a shape similar to the pattern on the sheet. The image data are successively read out from the image memory, and the pattern defined by the image data may be printed out by an image printer, for example.

In the above case, when printing out a pattern consisting of a closed loop line forming its contour line, there is occasionally needed a specific picture image processing in order that a pattern is printed out in a state where a region inside the closed contour of the pattern is totally "filled in (painted out)", or filled with printing dots. This is needed particularly when a handwritten graphic pattern is printed out.

A conventional method for filling-in the region inside the pattern consisting of the closed contour is firstly to scan the image memory in a main scanning direction coinciding with a direction of rows. During the main scan, an intersection point between a main scanning line and the contour line of the pattern consisting of the binary ones is monitored. When a first intersection point is detected, an operation of forcedly printing out a pixel of black, blue or the like is activated. That is, even when a pixel datum following the intersection point is a binary zero indicating a white or background pixel, the black pixel is forcedly printed out. This print-out operation is continued until a next intersection point is detected. Thereafter, when a third intersection point following the second intersect point is detected, the black pixel printing-out operation is activated again, and is continued until a fourth intersection point is detected.

However, the above conventional method has the following disadvantages, which are now described with reference to FIGS. 1A and 1B. MAX1 to MAX3 denote maximum points on a closed contour line of a graphic pattern, and MIN1 to MIN3 denote minimum points thereon. When a binary image pattern corresponding to the illustrated pattern stored in the image memory is scanned, the point MAX1 is detected as the first intersection point. Thus, black pixels are forcedly printed out even when subsequent pixel data have binary zeros, and a line L1 is thereby formed outside the pattern. It is noted that in the illustrated example, the above printing-out operation is terminated at an end of the line, for simplicity. Similarly, several lines such as lines L2 and L3 are formed outside the pattern. Further, line areas of the inner region of the closed contour such as areas $a_1$ and $a_2$ are not provided with black pixels. Thus, blank portions are formed in the inner region. As is seen from the above description, the presence of the maximum and/or minimum points causes the incorrect picture printing operation.

A similar disadvantage arises from noise such as spots on the background of the sheet of paper. This is because the noise on the background is processed as a pixel and cannot be discriminated from the pixels configuring the picture.

Moreover, in a case where a pattern consisting of a thin closed loop line is optically read, there is a probability that the pattern configured by the corresponding binary image data has a partial discontinuity. It will be easily seen that this discontinuity causes an incorrect printing-out operation as above.

SUMMARY OF THE INVENTION

Accordingly, a general object of the present invention is to provide a novel and useful method and an apparatus for filling in a region inside a closed loop line of a pattern with pixel data having values identical to those of pixel data forming the loop line, whereby the disadvantages of the conventional method have been eliminated.

A more specific object of the present invention is to provide a method and an apparatus for filling a region inside a closed loop line of a pattern with pixel data having values identical to those of pixel data forming the loop line, in which an inner region surrounded by the loop line can be correctly filled with black pixel data or the like corresponding to printing dots without incorrectly filling-in an outside region thereof.

Another object of the present invention is to provide a method and an apparatus for filling a region inside a closed loop line of a pattern with pixel data having values identical to those of pixel data forming the loop line, whereby the adverse effect of noise on a sheet of paper to be scanned is eliminated.

Still another object of the present invention is to provide a method and an apparatus for filling a region inside a closed loop line of a pattern with pixel data having values identical to those of pixel data forming the loop line, in which pixel data of black or the like are correctly filled into the inner region even when a contour line having a discontinuity is processed.

A further object of the present invention is to provide a method and apparatus for filling a region inside a closed loop line of a pattern with pixel data having values identical to those of pixel data forming the loop line which can cope with handwritten patterns.

The above objects of the present invention can be achieved by a method for filling a region inside a closed loop line of a pattern with pixel data having values identical to those of pixel data forming the loop line, comprising the following steps of; storing pixel data in an image memory; sequentially extracting one pixel datum of a pixel to be processed from the image memory, together with pixel data of its neighboring pixels, by scanning the image memory at least one time; performing a logical operation for deciding whether or not a value of said one pixel datum should be changed to a value of the pixel datum identical to those of the pixel data forming the loop line by using values of the neighboring pixel data in addition to the value of said one pixel data; and storing a result of the logical operation in a related storage region of the image memory in place of the one pixel datum stored.

The above objects can also be achieved by an apparatus for filling a region inside a closed loop line of a pattern with pixel data having values identical to those of pixel data forming the loop line, comprising; a first image memory for storing pixel data therein; an image scanner for extracting pixel data from the first image memory by scanning the first image memory at least one time; a latch circuit for latching one pixel datum to be processed extracted from the first image memory together with pixel data of neighboring pixels; an operation circuit for performing a logical operation for deciding whether or not a value of said one pixel datum should be changed to a value of the pixel datum identical to those of the pixel data forming the loop line, by using values of the pixel data of the neighboring pixels in addition to the value of said one pixel; and a second image memory for storing a result of the logical operation in a related storage region.

Other objects, features and advantages of the present invention will become apparent from the following detailed description when read in conjunction with the accompanying drawings.

BRIEF DESCRIPTION OF THE DRAWINGS

FIGS. 1A and 1B are views for explaining disadvantages of the conventional method;

FIG. 3 is a view showing a matrix used in the process according to the embodiment of the present invention;

FIGS. 12A and 12B are views showing another examples of a matrix which may be used in the present invention.

DETAILED DESCRIPTION

Figure 2A:
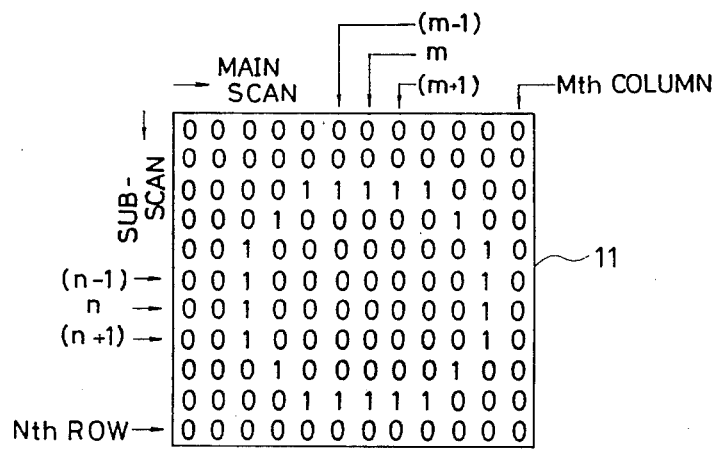
FIG. 2A is a view showing pixel data on a bit map of an image memory.
Figure 2B:
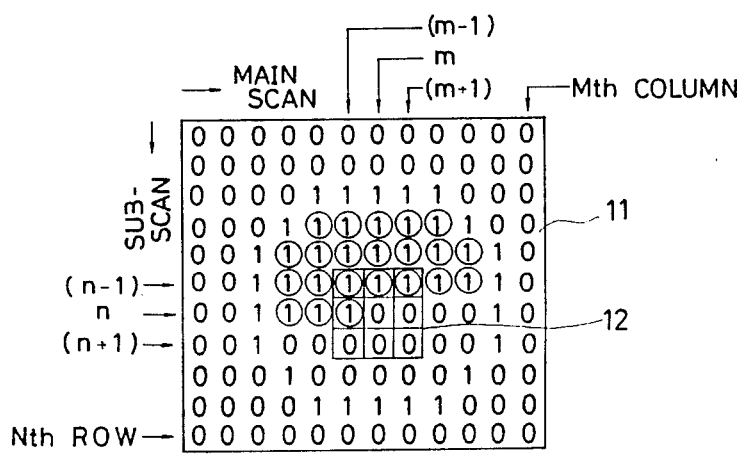
FIG. 2B is a view showing a bit map for explaining an embodiment of the present invention.

A description is now given on an embodiment of a method for filling a region inside a closed loop line of a pattern with pixel data having values identical to those of pixel data forming the loop line according to the present invention, by referring to FIGS. 2A, 2B and 3.

FIG. 2A shows pixel data stored in an image memory 11 forming a bit map consisting of M rows and N columns. The image memory 11 stores binary image data derived from an image scanner (not shown). As is known, the bit map can arrange the binary image data so that an image pattern having a shape similar to a picture on a sheet of paper, for example, is formed thereon. For example, when a picture to be read consists of a closed loop, a similar closed loop consisting of either one of binary values is extended on the bit map. In this figure, a numeral "1" corresponding to a binary one denotes the presence of a picture, and a numeral "0" corresponding to a binary zero denotes the absence of a picture, i.e., the background of the sheet of paper to be scanned. In the illustrated example, a pattern "0" consisting of pixel data having values of 1 is arranged on the image memory 11.

According to a preferred embodiment, as shown in FIG. 2B, the pixel data shown in FIG. 2A are processed so that a region having values of 0 inside the closed contour consisting of the pattern having a shape of "0" is replaced with pixel data each of which has a value of 1.

Referring to FIG. 2B, a read operation in a main scanning direction is carried out for the image memory 11 in a sub-scanning direction. The main scanning direction coincides with a direction of each row of the image memory 11, and the sub-scanning direction coincides with a direction of each column thereof. Firstly, each of the pixel data positioned in a range of the first column to the M'th column in the first row is sequentially read out. Next, each of the pixel data positioned in a range of the first column to the M'th column in the second row is sequentially read out. In this manner, all the pixel data amounting to (N×M) bits are read out. Each pixel datum read out from the image memory 11 is subjected to a logical operation for deciding whether or not a pixel datum should be kept at this original value or changed to a pixel datum having a value of 1 (a change from a white pixel datum to a black pixel datum which corresponds to a printing dot).

The logical operation uses not only a value of the pixel datum which is being subjected to the logical operation but also pixel data values associated with its neighboring pixels. That is, the pixel data in the vicinity of the pixel being processed are considered in order to decide whether or not the pixel datum being processed should be changed to a pixel datum of a value of 1. When a result of the logical operation is affirmative, the value of the pixel datum being processed is changed to the pixel datum having a value of 1. When the result of the logical operation is negative, the value of the pixel datum being processed is not changed, and its original value is kept. Then, the next pixel is subjected to the logical operation.

FIG. 3 shows a 3×3 matrix used for the above logical operation. Referring to FIG. 3, a character E denotes a pixel (which represents its data value also) being processed, and characters A, B, C, D, F, G, H and I are pixels (or their data values) adjacent to the pixel E. According to the present embodiment, five pixel data C, D, E, F and G surrounded by solid lines in the matrix of FIG. 3 are used as parameters in the logical operation. As shown, the pixel C is positioned one column after and one row before the pixel E. The pixel D is positioned one column before the pixel E. The pixel F is positioned one column after the pixel E. The pixel G is positioned one column before and one row after the pixel E.

In the logical operation, the following conditional expression can be employed:

$$E + ((D+G) \times (C+F)) = 1 \qquad (1)$$

where "+" denotes OR operation and "×" denotes AND operation.

The conditional expression (1) has the following effect. When the pixel datum E being processed has a value of 1, the condition is satisfied, and the value 1 of the pixel datum E is kept as it is. Adversely, when the pixel datum E has a value of 0, the data values of the adjacent pixel C, D, F and G are considered. At this time, when at least one of the pixel data D and G has a value of 1, and simultaneously at least one of the pixel data C and F has a value of 1, the conditional expression (1) is satisfied. In this case, the value 0 of the pixel datum E on the bit map is replaced with 1. When the conditional expression (1) is not satisfied, that is, when a result of the logical operation is 0, the value 0 of the pixel datum E is kept as it is.

FIGS. 2B shows a state where the above processing has proceeded to the pixel position of the n'th row and m'th column. In this figure, a pixel datum represented denotes ① a pixel datum having a value which has been changed from 0 to 1 by the logical operation defined by the conditional expression (1).

In the state shown in FIG. 3, the pixel datum positioned at the n'th row and the m'th column is being processed. When the pixel E of the matrix 12 is applied to the above pixel and the logical operation of the conditional expression (1) is carried out, an operation result obtained is affirmative. Consequently, the value of the pixel datum is changed from 0 to 1. Then, the next pixel datum positioned at the n'th row and (m+1)'th column is processed. At this time, because of the scan, the pixel E which was processed immediately before is now at the position of the pixel D of the matrix.

In the logical operation, values of the pixel data C and D decided by the logical operation of the conditional expression (1) are used as values thereof. For example, values of 1 are used as values of the pixel data C and D when the the pixel datum at the n'th row and m'th column is processed. It is noted that the pixel data C and D originally had values of 0.

In this manner, when the main scan for the n'th row is completed, the next (n+1)'th row is scanned and the pixel data are sequentially processed. Thereafter, when the pixel positioned at the N'th row and the M'th column has been processed, the process for all the pixels in one plane of the bit map ends. As a result, only the inner region of the contour shown in FIG. 2A is totally filled with the pixel data having values of 1.

In the above operation, if the storage region in which the pixel data of the scanned pattern are known beforehand, it is unnecessary to scan the entire plane of the bit map of the image memory 11. In this case, only the region inside the closed contour of the pattern may be scanned. Then, the logical operation is carried out for each of the pixel data obtained by this scan. This process results in reduction of the processing time.

When the pixel datum being processed is located at boundary regions of the image memory 11, i.e., the first row, the first column, the N'th row and the M'th column, the pixel data to be used as pixel data forming the 3×3 matrix 12 shown in FIG. 3 do not actually exist. In this case, the absence pixel data such as the neighboring pixel data C, D, F and G are processed so that the values of these pixel data are 0.

Figure 4A:
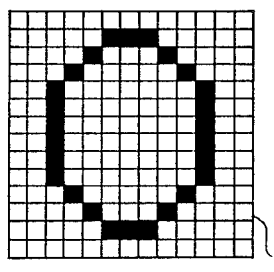
FIGS. 4A through 4G are views showing bit maps for explaining how an inner region is sequentially filled with black pixel data in accordance with the embodiment of the present invention.

A more detailed procedure of the above embodiment is now described with reference to FIGS. 4A through 4G. FIG. 4A shows a bit map of an image memory 11 on which pixel data themselves obtained by the scan are arranged as they are. That is, the logical operation has not yet been carried out. In FIGS. 4A through 4G, a symbol "■" denotes the presence of a pixel and corresponds to a value of 1 described previously. A blank square region denotes the absence of a pixel and corresponds to a value of 0. A symbol "●" denotes a pixel such that an original value 0 of a pixel datum obtained by the scan has been changed to a value of 1 by the logical operation process defined by the conditional expression (1). The symbol "●" corresponds to ① shown in FIG. 2B.

Figure 4B:
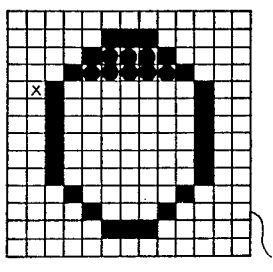

FIG. 4B shows a state where the logical operation processing has commenced, and the pixel datum indicated by "x" is being processed. In this state, there exist pixel data having values which have been changed from 0 to 1. The position indicated by "x" is a pixel position close to an outer portion of the contour of the image pattern in the main scanning direction. Assuming that the pixel at the position "x" is the pixel E of the matrix 12, E=0, C=0, D=0, F=1 and G=0. Thus, the conditional expression (1) is not satisfied. As a result, the pixel datum at the position "x" is kept at a value of 0 without being changed to a value of 1.

Subsequently, a pixel datum following the pixel datum at the position "x" in FIG. 4B is processed. This pixel of the pixel datum is one of the pixels forming the binary image pattern. Thus, the conditional expression (1) is satisfied, and its original value of 1 is kept.

Figure 4C:
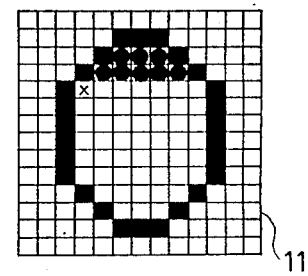
Figure 4D:
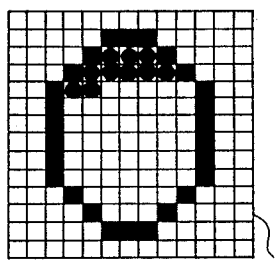

Next, a pixel datum following the pixel of the pattern is processed. This pixel datum is at a position "x" shown in FIG. 4C. The position "x" in FIG. 4C is close to an inner side of the contour. At the position "x", E=0, C=1, D=1, F=0 and G=1. Therefore, the conditional expression (1) is satisfied. As a result, the value of the pixel datum at the position "x" is changed from 0 to 1. A pixel datum subsequent to the pixel data whose value has been changed to 1 is also changed to a pixel datum of a value of 1, as shown in FIG. 4D.

Figure 4E:
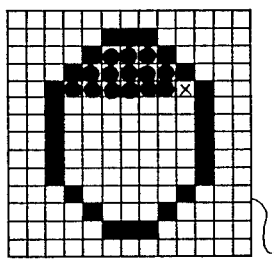
Figure 4F:
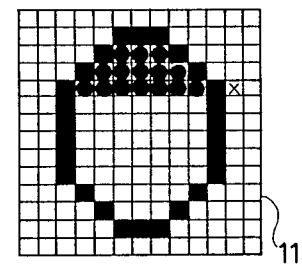

FIG. 4E shows a state where a pixel datum at the position "x" is processed. This pixel datum is close to the inner side of a pixel which is one of the pixels forming the contour (contour pixel). Assuming that the pixel at the position "x" is the pixel E, E=0, C=0, D=1, F=1 and G=0. Thus, the conditional expression (1) is satisfied. As a result, the value of the pixel datum at the position "x" is changed from 0 to 1. Subsequently, a pixel datum of the next pixel is processed. The pixel is the contour pixel, and therefore the conditional expression (1) is satisfied. Hence, the value is kept at a value of 1.

Subsequently, a pixel datum of the pixel next to the above contour is processed. This pixel is at the position "x" shown in FIG. 4F. In this case, E=0, and the pixels close to and on the right hand side of the contour pixel have values of 0. Since both the pixel data C and F have values of 1, the conditional expression (1) is not satisfied irrespective of values of the pixel data D and G. Therefore, the value of this pixel datum being processed is kept at 0.

Figure 4G:
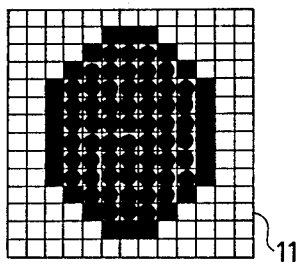

When the logical operation has been carried out for all the pixel data on the bit map, a revised image pattern shown in FIG. 4G is obtained. The inner region of the pattern represented by "■" has been totally filled with the pixel data "●" having values of 1. The region outside the pattern does not have any pixel data having values of 1.

Figure 5A:
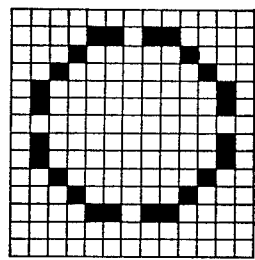
FIG. 5A is a view showing a bit map on which a pattern has a partial discontinuity on its contour line.
Figure 5B:
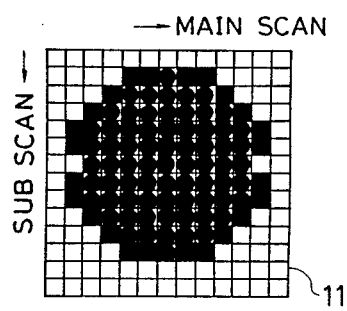
FIG. 5B is a view showing a pattern on the bit map which is obtained by processing the pattern shown in FIG. 5A in accordance with the embodiment of the present invention.

The above embodiment employing the matrix 12 and the conditional expression (1) can cope with an image pattern having a discontinuity amounting to one pixel. For example, when an image pattern having discontinuities shown in FIG. 5A is processed by the embodiment described above, a revised image pattern shown in FIG. 5B is obtained. It will be seen from FIG. 5B, the embodiment is not affected by the discontinuities. It is understood that the conventional method cannot process the image pattern having discontinuities correctly.

Figure 6:
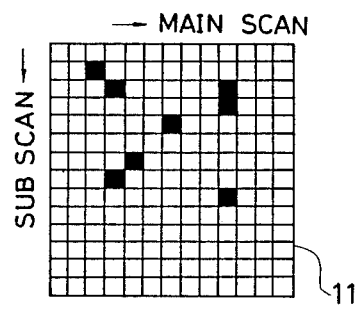
FIG. 6 is a view showing a bit map on which noise pixel data are formed.

In addition to the above advantage, the embodiment has another advantage in that it is immune to scattered noise on the background of the sheet of paper to be scanned. When a sheet having no pattern is scanned, pixel data as shown in FIG. 6 would be stored in the image memory 12. It may be said that noise spots "■" on the sheet are stored in a scattered state. When the logical operation defined by the conditional expression (1) is carried out for the pixel data shown in FIG. 6, an image pattern obtained is exactly he same as that of FIG. 6. From this viewpoint, it can be said that the present embodiment can discriminate true pixel data against noise pixel data.

Moreover, the above embodiment can cope with handwritten patterns. Generally, handwritten patterns have relatively wider contour portions and relatively narrower contour portions. The above embodiment is not affected by the above fact, because a value of each pixel datum is decided by using the matrix and the conditional expression (1) which are not affected by the thickness of a contour line.

It is possible to delete the noise pixel data from the image memory 11 by using a conditional expression formed by adding an auxiliary condition to the conditional expression (1), as shown by the following conditional expression (2):

$$(E+((D+G)\times(C+F)))\times(A+B+C+D+F+G+H+I) \quad (2)$$

where "+" denotes OR operation and "×" denotes AND operation.

In the conditional expression (2), a part $(A+B+C+D+F+G+H+I)$ is an auxiliary condition. According to the condition expression (2), when values of eight adjacent pixel data are all 0, a result of the logical operation is 0. That is, the pixel datum having a value of 1 surrounded by the 8 adjacent pixel data having values of 0 is found to be a noise pixel datum. Thus the value of the pixel datum E which is a noise pixel datum is replaced with a value of 0. This noise deleting process may be performed before the above filling-in process is carried out.

In the above embodiment, the logical operation uses 5 pixel data in the 3×3 matrix. It is also possible to utilize more than 5 pixel data in the matrix for the logical operation. Further, a matrix consisting of more than 9 pixel data, a 4×4 matrix shown in FIG. 12A may be used for the logical operation for deciding the value of each pixel datum. In the 4×4 matrix, a pixel G is a pixel being processed. The 4×4 matrix may result in an improved accuracy in deciding the values of the pixel data. However, the processing speed would be somewhat degraded.

As discussed in the foregoing, the embodiment employing the 3×3 matrix and the conditional expression (1) can cope with a pattern having discontinuities and noise amounting to approximately one pixel. For this reason, the embodiment can cope with many arbitrary patterns. However, when a pattern having a substantially T-shaped configuration as shown in FIG. 7A is processed, a partial error would arise.

Figures 7A, 7B, 7C:
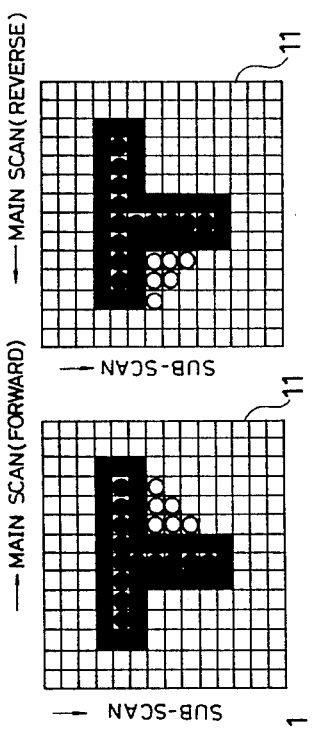
FIGS. 7A through 7C are views showing bit maps for explaining another embodiment of the present invention.

FIG. 7B is a pattern having revised pixel data obtained by the logical operation of the embodiment. In FIG. 7B, a symbol "o" denotes a pixel datum having a value of 0 outside the contour of the pattern that has been incorrectly changed to a pixel datum having a value of 1. That is, the conditional expression (1) cannot prevent the occurrence of an erroneous pixel datum as shown in FIG. 7B.

The occurrence of such erroneous pixel data can be prevented by performing the main scan in forward and reverse directions. In the forward main scanning direction, the main scan is carried out from the left-hand side to the right-hand side of the image memory 11 as shown in FIG. 7B. In the reverse main scanning direction, the main scan is performed from the right-hand side to the left-hand side of the image memory 11 as shown in FIG. 7C. As shown in FIG. 7C, erroneous pixel data represented by "o" are generated. It is seen from FIGS. 7B and 7C that the positions of the erroneous pixel data shown in FIG. 7B are different from the positions of the erroneous pixel data shown in FIG. 7C. Therefore, these erroneous pixel data can be deleted from the image memory 11 by performing an AND operation between the pixel data of FIGS. 7B and 7C. In this case, the AND operation is carried out between two pixel data designated by the sam address information. The reverse main scan for one row may be carried out immediately after the forward main scan for that row has been completed. In this case, the AND operation is carried out row by row. Alternatively, either one of the forward and reverse main scans is carried out for all the pixel data on the bit map, and subsequently the remaining is carried out. This corresponds to the cases shown in FIG. 7B and 7C.

A matrix used at the time of the reverse main scan is shown in FIG. 12B. A matrix 13 has a reflection relationship with the matrix 12 shown in FIG. 3 with respect to a column having the pixels B, E and H. The conditional expression (1) can be used for the reverse main scan.

In order to carry out the AND operation between the pixel data obtained by the forward and reverse main scans (also referred to as a reciprocating main scan), it is necessary to use a memory for temporarily storing the logical operation results obtained by one of the main scans. When the image memory has an additional storage region amounting to one row of the bit map, this storage region may be used for the above purpose. However, the address control for the image memory would become complicated. Therefore, a line memory amounting to one row of the bit map is preferably employed independent of the image memory 11.

Figures 8A, 8B, 8C:
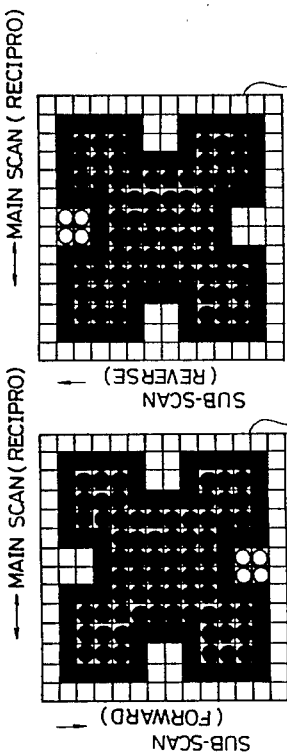
FIGS. 8A through 8C are views showing bit maps for explaining still another embodiment of the present invention.

A further example is shown in FIGS. 8A through 8C. A pattern shown in FIG. 8A has recessed portions at the top, bottom, left and right hand sides thereof. When the process described with reference to FIGS. 7A through 7C has been performed for the pattern of FIG. 8A, a pattern shown in FIG. 8B is obtained. That is, FIG. 8B shows a result of the AND operation between the two results for each pixel obtained by each of the forward and reverse main scans. As illustrated in FIG. 8B, erroneous pixel data represented by "o" are generated in the vicinity of the lower recessed portion. That is, the pixel data at the positions "o" satisfy the conditional expression in both the forward and reverse main scans.

The occurrence of the erroneous pixel data generated even by using the reciprocating main scan can be prevented by employing another sub-scan in addition to the sub-scan used in this embodiment. The added sub-scan has a sub-scanning direction from the lower side to the upper side of the image memory 11. Hereafter, the sub-scan in the above direction is referred to as a reverse sub-scan, and the other is referred to as a forward sub-scan. When the forward main scan is selected, the matrix 12 shown in FIG. 3 and the conditional expression (1) can be employed irrespective of the directions of the sub-scans. Alternatively when the reverse main scan is selected, the matrix 13 shown in FIG. 12B and the conditional expression (1) can be employed irrespective of the directions of the sub-scans.

FIG. 8C shows a result of the AND operation between the two results obtained by each of the forward and reverse main scans when the reverse sub-scan is employed. As shown, erroneous pixel data represented by "o" are generated at positions that are different from positions of the erroneous pixel data shown in FIG. 8B. Thus, the occurrence of the erroneous pixel data shown in FIGS. 8B and 8C can be prevented by performing an AND operation between the pixel data shown in FIGS. 8B and 8C.

In order to implement the reciprocating main and sub-scans, a memory region is necessary to store both the pixel data shown in FIG. 8B and the pixel data shown in FIG. 8C. That is, a memory region having $(2N \times M)$ bits must be prepared. For example, a single image memory having the above storage capacity may be used. However, the access control in this case would become very complicated. Thus, from the viewpoint of access time, it is preferable to use two independent image memories each having $(N \times M)$ bits.

Figure 9:
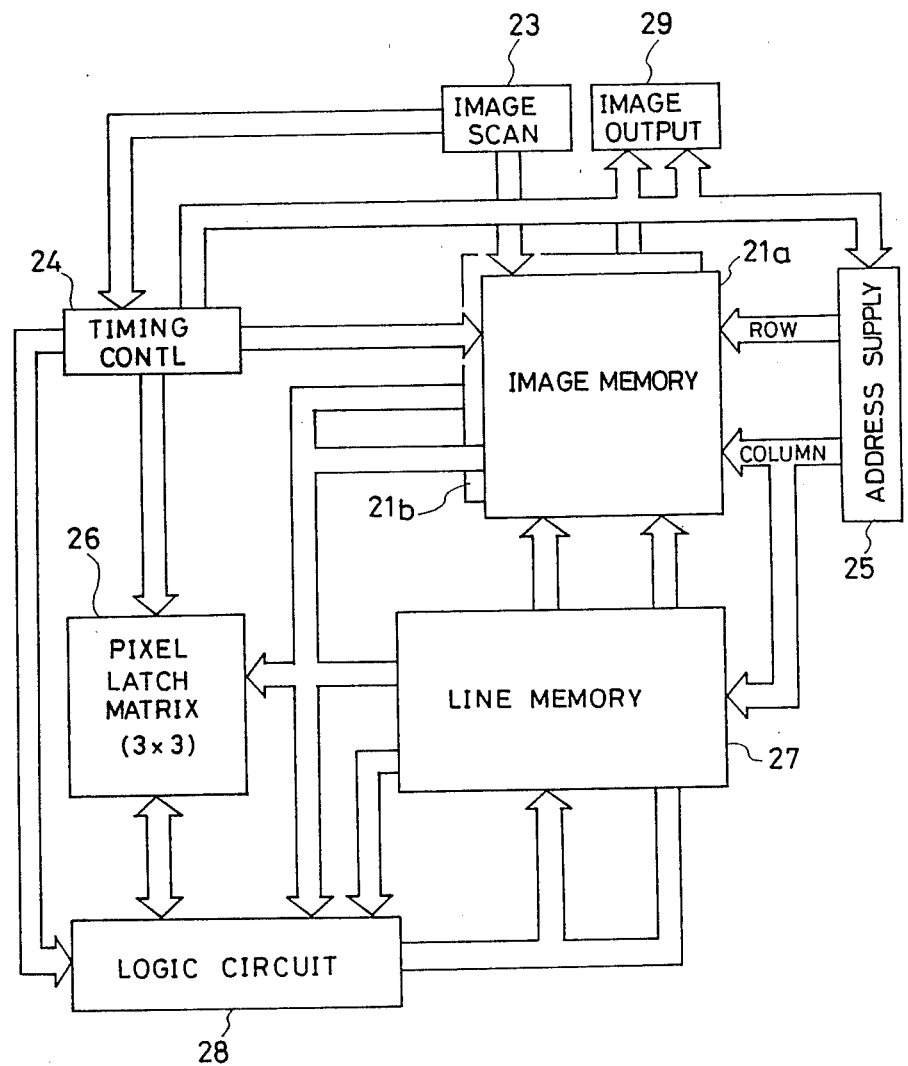
FIG. 9 is a block diagram of an apparatus capable of implementing the method of the present invention.
Figure 10:
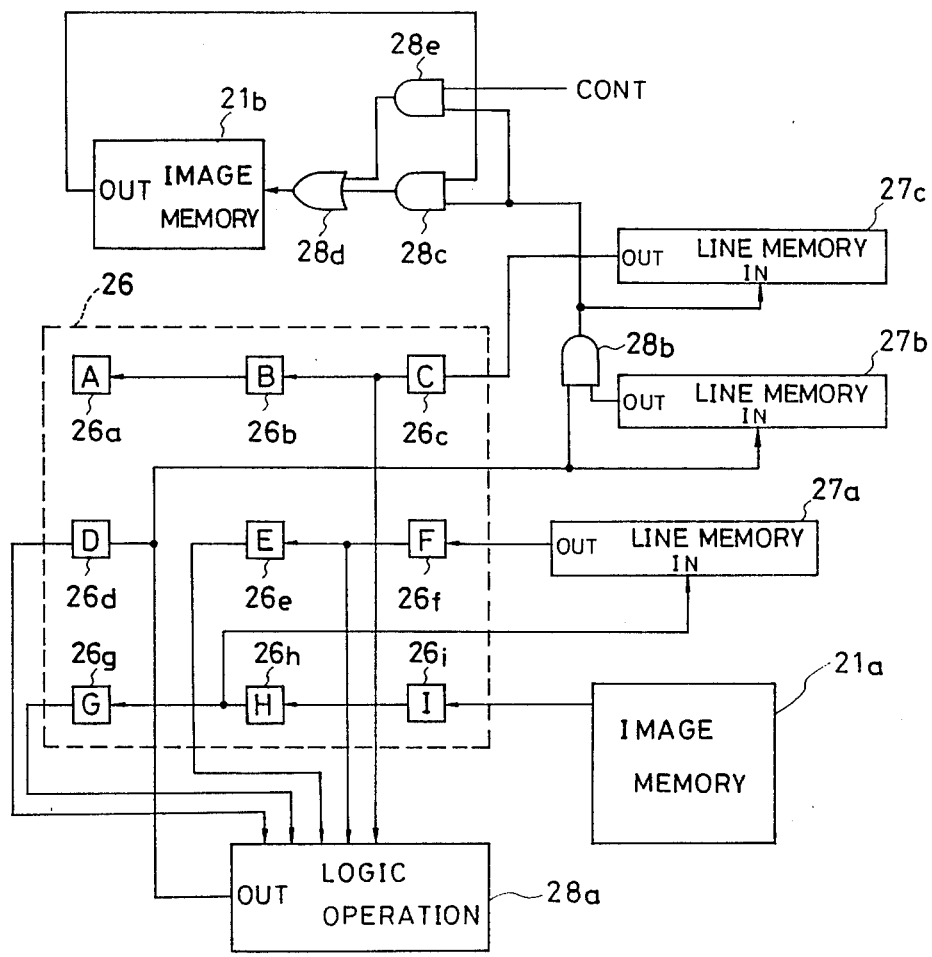
FIG. 10 is a circuit diagram of essential parts of the block configuration shown in FIG. 9.

A description is now given of an apparatus capable of implementing the above embodiments, by referring to FIGS. 9 and 10.

An apparatus comprises two picture image memories 21a and 21b each having a memory capacity of $(N \times M)$ bits. An image scanner 23 is used to optically read a pattern on a sheet of paper. The image scanner is connected to the image memory 21a and sends consecutive pixel data (image data) to the image memory 21a. At this time, an address consisting of a write row address and a write column address generated by an address supply circuit 25 is fed to the image memory 21a. Each pixel datum indicated by one of binary values 0 and 1 from the scanner 23 is written into a corresponding storage region designated by the address from the address supply circuit 25. A timing for the write/write operation is defined by a timing control circuit 24. When the pixel data amounting to $(N \times M)$ bits have been stored in the image memory 21a, a pattern consisting of binary 1s is arranged on a bit map of the image memory 21a.

A 3×3 pixel data latch matrix circuit 26 is used to latch 9 pixel data including pixel data used for the logical operation defined by the conditional operation (1). A logic circuit 28 carries out the logical operation for the predetermined 5 pixel data out of the 9 pixel data latched in the latch matrix circuit 26. A line memory 27 consists of three line memories, each of which has a 1 (row)×M (column) bit structure.

FIG. 10 shows a detailed circuit structure of the latch matrix circuit 26, the line memory 27 and the logic circuit 28.

The latch matrix circuit 26 consists of 9 one-bit latch elements 26a through 26i, which latch the respective pixel data A through I shown in FIGS. 3 and 12B. As described previously, the pixel data C, D, E, F and G are used for the logical operation for deciding a value of the pixel datum E. Therefore, output signals of the latch elements 26c, 26d, 26e, 26f and 26g ar supplied to a logical operation circuit 28a capable of implementing the logical operation. The logic circuit 28 comprises the logical operation circuit 28a and logic circuits 28b through 28e.

When the latch element 26e has the pixel datum E positioned at the n'th row and the m'th column shown in FIG. 2B, the pixel data G, H and I in the (n+1)'th row are latched data sequentially supplied from the image memory 21a. The pixel data E and F in the n'th row are latched data sequentially supplied from a line memory 27a. The pixel datum D in the n'th row is supplied from an output terminal of the logical operation circuit 28a which carries out the logical operation defined by the conditional expression (1). The pixel data A, B and C are latched data sequentially supplied from a lime memory 27c. Each of the pixel data in the line memory 27c is a result of an AND operation between the two results of the logical operations for the pixel data in the (n−1)'th row which have been already decided by the reciprocating main scan.

In the illustrated structure, the value of each pixel datum is decided by the reciprocating main and sub-scans just like the case shown in FIGS. 8B and 8C. For example, the pixel datum in the (n+1)'th row is read out from the image memory 21a starting with the pixel datum positioned at the (n+1)'th row and the 1st column, and is transferred to the latch element 26i (forward main scan). At the same time, the pixel data in the n'th row are read out from the line memory 27a starting with the pixel datum at the first column, and are supplied to the latch element 26f. During the forward scan, an input terminal of the line memory 27a is maintained in a closed state. Likewise, the pixel datum in the (n−1)'th row is read out from the line memory 27c and is sent to the latch element 26c. The pixel data C, D, E, F and G out of the pixel data set in the respective latch elements are subjected to the logical operation performed by the logical operation circuit 28a. The result of the logical operation is sent to the latch element 26d and the line memory 27b. During the main scan, the line memory 27b outputs a value of 0 through its output terminal OUT, and an input terminal of the line memory 27c is kept in the closed state.

In this manner, the result of the logical operation associated with each pixel in the n'th line by the forward main scan is sent to the latch element 27b and is temporarily stored therein. At this time, no signal is outputted from the line memory 27b.

Subsequently, the reverse main scan is activated, and the pixel data in the same row, i.e., the (n+1)'th row are reach out from the image memory 21a starting with the M'th column. During the reverse main scan, the pixel datum H from the latch element 26h is transferred to the line memory 27a. When the pixel data are outputted from the image memory 21a by the reverse main scan, the pixel data in the n'th row are outputted from the line 27b in the reverse scanning direction. Likewise, the pixel data in the (n−1)'th row are read out from the line memory 27c. The 5 pixel data C, D, E, F and G of the pixel data set in the respective latch elements are subjected to the logical operation performed by the logical operation circuit 28a. The result of the logical operation is sent to the latch element 26d. During the reverse scan, the input terminal of the line memory 27b is kept in the closed state.

In synchronization with outputting of the result from the logical operation circuit 28a, the pixel datum having the same column address as the pixel datum read out from the logical operation circuit 28a is outputted from the line memory 27b. The AND circuit 28b performs the AND operation between the pixel datum E from the logical operation circuit 28a and the pixel datum E from the line memory 27b. As described before, the pixel datum E from the line memory 27b has the value calculated at the time of a forward main scan, and the pixel data E from the logical operation circuit 28a has the value calculated at the time of a reverse main scan. An AND operation result is sent to the line memory 27c as well as the image memory 21a through the AND circuit 28e and the OR circuit 28d. During the reverse scan, the AND circuit 28e is provided with a control signal CONT having a value of 1 from the timing control circuit 24, and the output signal of the image memory 21b is held at 0. The pixel datum E from the AND circuit 28d is stored in a storage region designated by the address derived from the address supply circuit 25. At this time, when the pixel datum E from the AND circuit 28d has the address of the n'th row and the m'th column, the image memory 21a is provided with this address.

In this manner, the result of the AND operation for each of all the pixel data on the bit map of the image memory 21a is stored in the image memory 21b. The results of the AND operation obtained at this time correspond to the memory content shown in FIG. 8B, when the pixel data shown in FIG. 8A are processed.

Next, the sub-scanning direction is reversed, and the logical operation is carried out in a manner similar to the above. At the time of the reverse main scan, the AND operation result outputted from the AND circuit 28b is supplied to one of two input terminal 28c. The other is provided with the corresponding AND operation result read out from the image memory 21b. Both the AND operation results are associated with one pixel on the bit map. An output of the AND circuit 28c is inputted into the related storage regions as a finally decided pixel datum (Value) of each pixel. During the selection of the reverse sub-scan, the control signal applied to the AND circuit 28e is kept at a value 0.

In this way, the region inside the pattern consisting of the closed loop line is totally filled with the pixel data having values of 1 (corresponding to black pixel data, for example). The pixel data may be supplied to an image output unit 29 such as an image printer.

Figure 11A:
FIGS. 11A through 11G are views showing patterns before and after the present invention is used.
Figure 11B:
Figure 11C:
Figure 11D:
Figure 11E:
Figure 11F:
Figure 11G:

FIGS. 11A through 11G shows various patterns before and after the present invention is used. FIG. 11A shows a case where a plurality of patterns each consisting of closed loop lines are formed on a bit map. An inner region of one of the patterns is painted out with black beforehand. The present invention can correctly process such a pattern as shown by the pattern on the right-hand side. FIG. 11B shows a case where two patterns each consisting of closed loop lines cross. When these patterns are processed in accordance with the conventional method, a blank is formed in an intersection of the two patterns. FIG. 11C shows a pattern having projected lines. It is noted that when the pattern is processed by the conventional method, a spacing between the projected lines is filled with black pixel data. FIG. 11D shows a case where a circular pattern is located in a recess similar to that shown in FIG. 8A. FIG. 11E shows a pattern, an inner region thereof having patterns formed by lines or points. FIG. 11F shows a pattern having a discontinuity amounting to approximately one pixel. FIG. 11G shows a pattern, outer regions thereof having noise like spots. The inner region is totally filled with black pixel data without being affected by the noise.

The present invention is not limited to the embodiment described above, but various variations and modifications may be made without departing from the scope of the present invention;

What is claimed is:

1. A method for filling a region inside a closed loop line of a pattern with pixel data having values identical to those of pixel data forming the loop line, comprising the following steps of:

storing pixel data in an image memory;

sequentially extracting one pixel datum of a pixel to be processed from the image memory, together with pixel data of its neighboring pixels by scanning the image memory at least one time, wherein the extracting step extracts four pixel data of pixels adjacent to said one pixel to be processed on the image memory in addition to said one pixel;

performing a logical operation for deciding whether or not a value of said one pixel datum should be changed to a value of the pixel datum identical to those of the pixel data forming the loop line, by using values of the pixel data of the neighboring pixels in addition to the value of said one pixel datum, wherein the image memory has a bit map of N rows and M columns, and wherein the logical operation is for deciding whether or not the following conditional expression is satisfied;

$$E+((D+G)\times(C+F))=1$$

where a pixel datum E is a datum to be processed, a pixel datum C is positioned one column after and one row before the pixel datum E on the bit map, a pixel datum D is positioned one column before the pixel datum E, a pixel datum F is positioned one column after the pixel datum E, and a pixel datum G is positioned one column before and one row after the pixel datum E, and where a symbol + and × represent logical OR and AND operations, respectively; and storing a result of the logical operation in a related storage region of the image memory in place of said one pixel datum.

2. The method as claimed in claim 1, wherein the pixel data stored in the image memory are data obtained by optically reading a pattern on an object.

3. A method for filling a region inside a closed loop line of a pattern with pixel data having values identical to those of pixel data forming the loop line, comprising the following steps of:

storing pixel data in an image memory;

sequentially extracting one pixel datum of a pixel to be processed from the image memory, together with pixel of data of its neighboring pixels by scanning the image memory at least one time, wherein the extracting step extracts the pixel data by scanning the image memory two times in mutually opposing main scanning directions consisting of forward and reverse scanning directions, and a logical operation performing step is carried out for the one pixel datum extracted by each of the scans;

performing the logical operation for deciding whether or not a value of said one pixel datum should be changed to a value of the pixel datum identical to those of the pixel data forming the loop line, by using values of the pixel data of the neighboring pixels in addition to the value of said one pixel datum;

storing a result of the logical operation in a related storage region of the image memory in place of said one pixel datum; and performing an AND operation between two results of the logical operations associated with the respective main and reverse main scanning directions, and wherein a result of the AND operation relating to said one pixel datum is stored in the related storage region of the image memory.

4. The method as claimed in claim 3, wherein the scans in the forward and reverse main scanning directions are alternately carried out row by row.

5. A method for filling a region inside a closed loop line of a pattern with pixel data having values identical to those of pixel data forming the loop line, comprising the following steps of:

storing pixel data in an image memory;

sequentially extracting one pixel datum of a pixel to be processed from the image memory, together with pixel data of its neighboring pixels by scanning the image memory at least one time, wherein the extracting step extracts the pixel data by scanning the pixel data four times in main and sub-scanning directions selected from among four combinations of forward and reverse main scanning directions and forward and reverse sub-scanning directions, and a logical operation performing step is carried out for the one pixel datum extracted by each of the four different scans;

performing the logical operation for deciding whether or not a value of said one pixel datum should be changed to a value of the pixel datum identical to those of the pixel data forming the loop line, by using values of the pixel data of the neighboring pixels in addition to the value of said one pixel datum; and storing a result of the logical operation in a related storage region of the image memory in place of said one pixel datum.

6. The method as claimed in claim 5, wherein the method further comprises a step of performing a first AND operation between two results of the logical operations associated with the forward and reverse main scans when the forward sub-scan is employed, a step of performing a second AND operation between two results of the logical operations associated with the forward and reverse main scans when the reverse sub-scan is employed, and a step of performing a third AND operation between two results of the first and second AND operations, and wherein a result of the third AND operation obtained relating to said one pixel datum is stored in the related storage region of the image memory.

7. An apparatus for filling a region inside a closed loop line of a pattern with pixel data having values identical to those of pixel data forming the loop line, comprising:

first image memory means for storing pixel data therein;

scanning means for extracting pixel data from the first image memory by scanning the first image memory means at least one time, wherein the extracting means extracts pixel data by scanning the first image memory two times in forward and reverse main scanning directions, and operation means for performing the logical operation for each of the pixel data extracted by the extracting means, and wherein the apparatus further comprises AND operation means for performing an AND operation between the two results of the logical operations associated with the respective forward and reverse main scanning directions, so that a result of the AND operation relating to said one pixel is stored in the related storage region in a second image memory means;

latch means for latching one pixel datum to be processed which is extracted from the first image memory means together with pixel data of neighboring pixels;

the operation means performing a logical operation for deciding whether or not a value of said one pixel datum should be changed to a value of the pixel datum identical to those of the pixel data forming the loop line, by using values of the pixel data of the neighboring pixels in addition to the value of said one pixel datum; and the second image memory means storing a result of the logical operation in its related storage region.

8. The apparatus as claimed in claim 7, wherein the apparatus further comprises line memory means for temporarily storing the result of the logical operation associated with one of the forward and reverse main scanning directions, and the AND operation means performs the AND operation between the result of the logical operation supplied from the line memory means and the result of the logical operation supplied from the operation means.

9. An apparatus for filling a region inside a closed loop line of a pattern with pixel data having values identical to those of pixel data forming the loop line, comprising:

first image memory means for storing pixel data therein;

scanning means for extracting pixel data from the first image memory by scanning the first image memory means at least one time, wherein the extracting means extracts pixel data by scanning the first image memory four times in main and sub-scanning directions selected from among four combinations of forward and reverse main and sub-scanning directions, and operator means for performing a logical operation for the one pixel datum extracted by each of the four different scans, and wherein the operation means further comprises a first AND operation means for performing a first AND operation between two results of the logical operations associated with the forward and reverse main scans when the forward sub-scan is employed, a second AND operation means for performing a second AND operation between two results of the logical operations associated with the forward and reverse main scans when the reverse sub-scan is employed, and a third AND operation means for performing a third AND operation between two results of the first and second AND operations, and wherein an output signal of the third AND operation means is stored in the related storage region of the image memory means;

latch means for latching one pixel datum to be processed which is extracted from the first image memory means together with pixel data of neighboring pixels;

the operation means performing a logical operation for deciding whether or not a value of said one pixel datum should be changed to a value of the pixel datum identical to those of the pixel data forming the loop line, by using value of the pixel data of the neighboring pixels in addition to the value of said one pixel datum; and second image memory means for storing a result of the logical operation in its related storage region.

* * * * *